UNITED STATES PATENT OFFICE.

HEINRICH KLEMM AND CARL KLEMM, OF PFULLINGEN, WÜRTEMBERG, GERMANY.

IMPROVEMENT IN THE MANUFACTURE OF LEATHER.

Specification forming part of Letters Patent No. 160,440, dated March 2, 1875; application filed February 2, 1875.

*To all whom it may concern:*

Be it known that we, HEINRICH KLEMM and CARL KLEMM, of Pfullingen, in the Kingdom of Würtemberg, in the Empire of Germany, have invented a certain new and useful Improvement in Treating Hides and Skins in the Manufacture of Leather, of which the following is a specification:

Our invention consists in the process of treating hides and skins with two successive compositions, the first of which consists of sugar of grapes, train-oil, and tallow, and the second of sugar of grapes, train-oil, tallow, and resin, whereby extraordinary toughness, durability, and strength are imparted to the finished article.

In carrying out our invention, we mix together the ingredients for the first composition in about the following proportions—that is to say, for every four hundred pounds weight of the composition, we take of sugar of grapes two hundred pounds; train-oil, one hundred and thirty-three pounds; tallow, sixty-seven pounds, the two latter ingredients being substituted, if desired, by any other animal or vegetable fat, or grease, or fatty substance. The sugar of grapes is heated in any suitable boiler until melted, during which process it is continually stirred. The tallow is then added, and the stirring continued until thoroughly intermixed, and until it is reduced to a temperature of 25° Reaumur.

We then proceed to prepare the second composition, for which we take of sugar of grapes, one hundred and eighty pounds; train-oil, one hundred and twenty pounds; tallow, sixty pounds; resin, forty pounds, which proportions, however, may be varied according to the nature or quality of the hides and skins to be treated. Instead of the sugar of grapes we can use sirup, treacle, or other saccharine matter, according to the quality of the leather to be manufactured.

This composition is mixed together in a similar manner to the first composition, except that it is continually stirred until cold, and water is added in small quantities until the whole assumes the form of a light-yellow salve.

The hides and skins, having been duly divested of hair, and having been steeped in water, and partially dried, are laid upon tables, and smeared over with the first composition on both sides. They are then fulled in the fulling-tub, the latter having first been heated to from 30° to 40° Reaumur, from six to eight hours, in which time they will have absorbed the composition. They are then in the same manner smeared over with the second composition, and fulled as before, the fulling-tub being also heated as before, and when the hides or skins have been thoroughly impregnated they are converted into leather, being made plane or smoothed according to the usual method, and when dry they are fit for use. If the hides or skins are extra strong or thick, the smearing of the second composition, as well as the fulling, may be repeated to advantage.

The leather receives by this process a yellow color; but a brown or any other color may be had by the use of a dye, such as tan or other suitable material, previous to the application of the first composition.

By this process we obtain leather of extraordinary toughness, durability, and strength, and which is especially adapted for picking-bands, lace-leather, and other articles requiring tough and strong leather.

What we claim as new, and desire to secure by Letters Patent, is—

1. The process of treating hides and skins with the two successive compositions, substantially as described.

2. The compositions herein described, prepared of the ingredients and in about the proportions set forth.

This specification signed by us this 23d day of September, 1872.

HEINRICH KLEMM.
CARL KLEMM.

Witnesses:
LUDWIG HAGENLOCH,
CHRISTOPH GEISEL.